Figure 11:
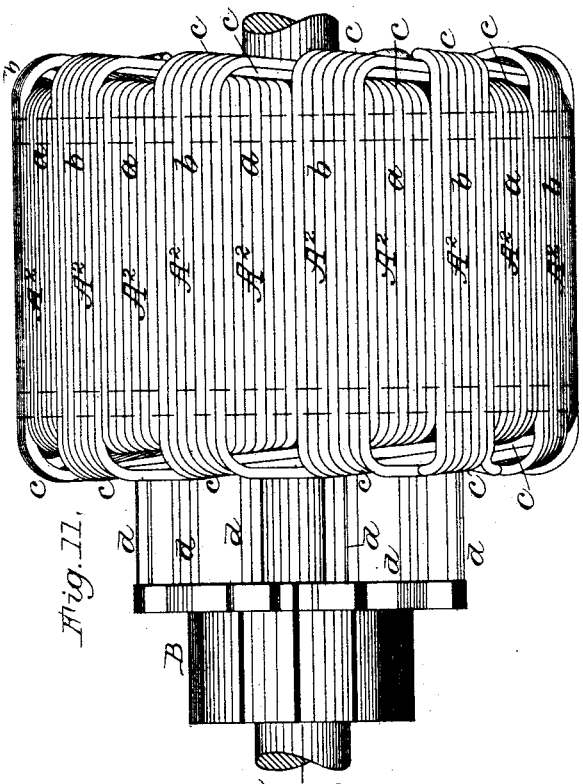

(No Model.) 5 Sheets—Sheet 1.
R. EICKEMEYER.
DYNAMO ELECTRIC MACHINE.
No. 473,618. Patented Apr. 26, 1892.
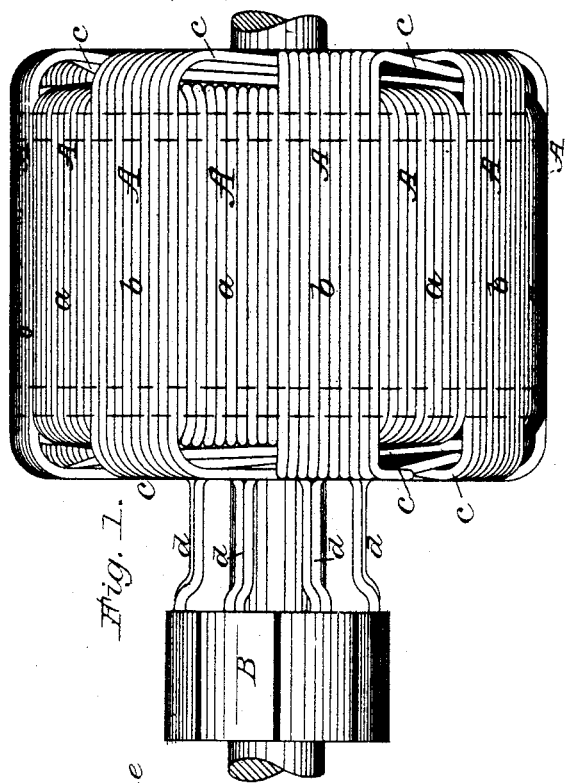
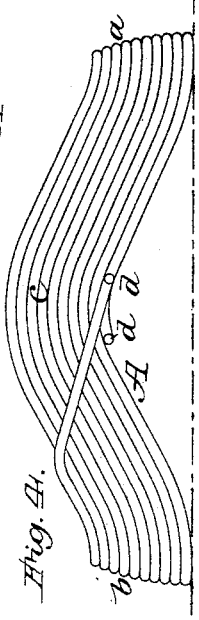
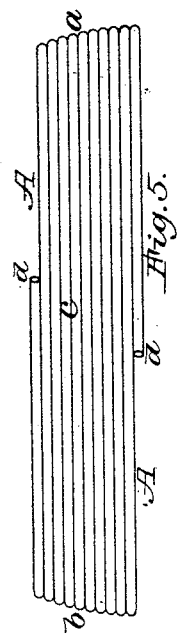
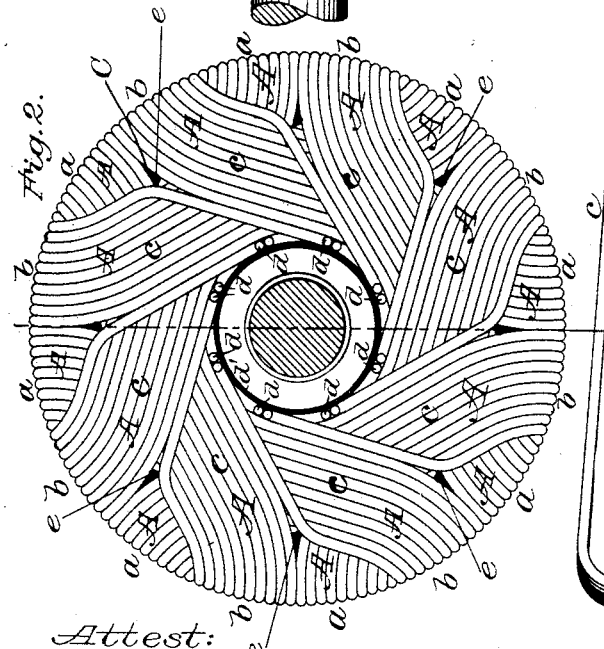
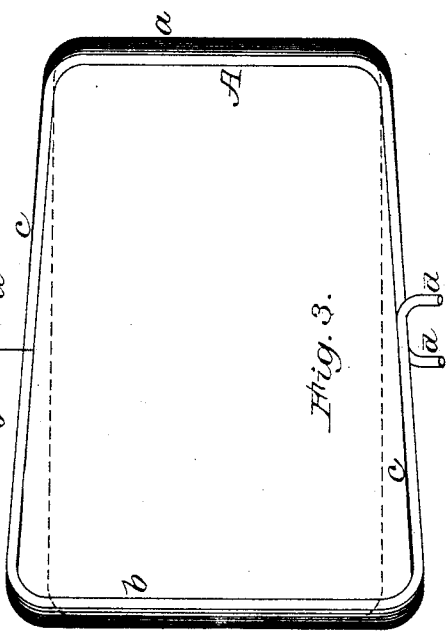
Attest:
Philip F. Larner
Howell Baute
Inventor:
Rudolf Eickemeyer
By M. E. Stood
Attorney.

(No Model.) 5 Sheets—Sheet 2.
R. EICKEMEYER.
DYNAMO ELECTRIC MACHINE.
No. 473,618. Patented Apr. 26, 1892.
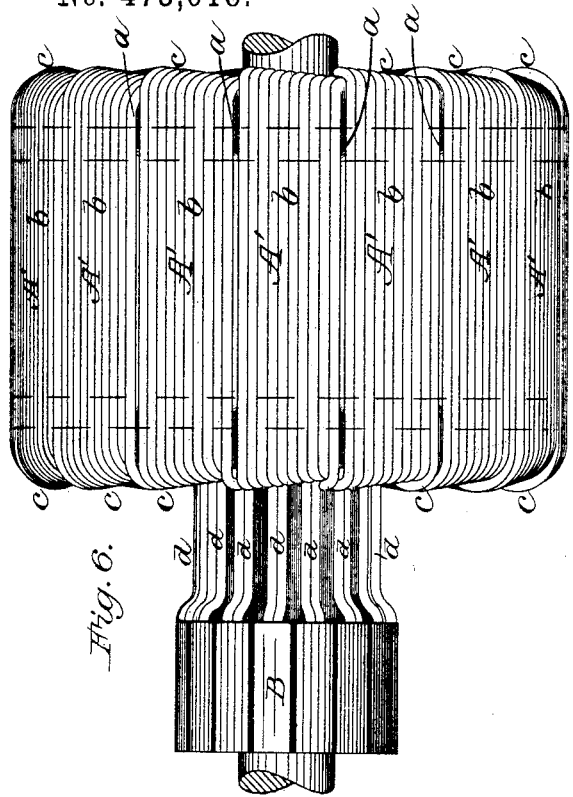
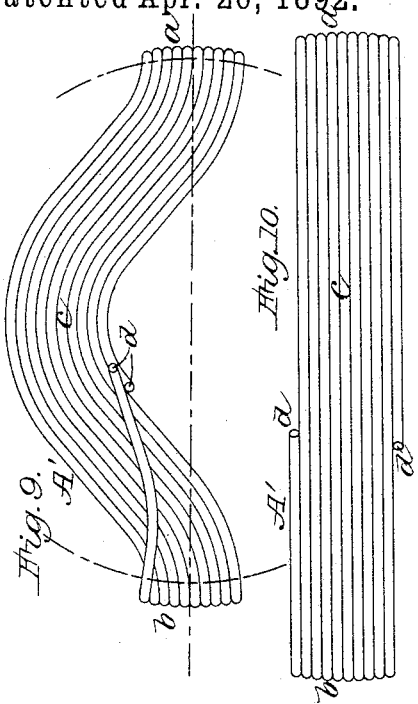
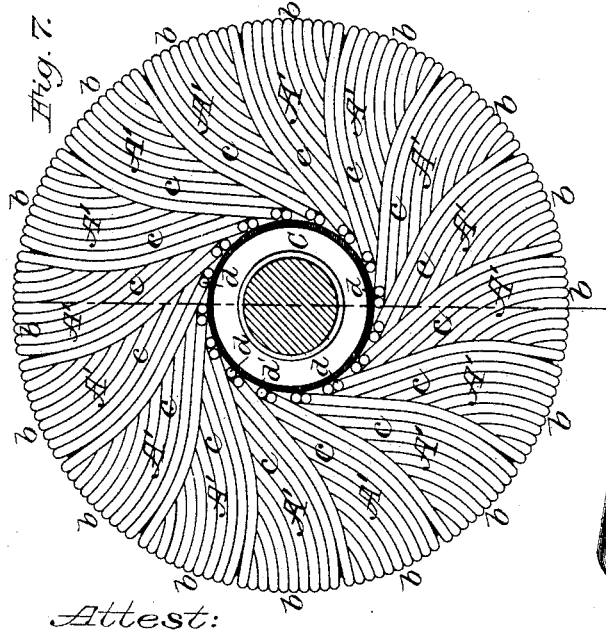
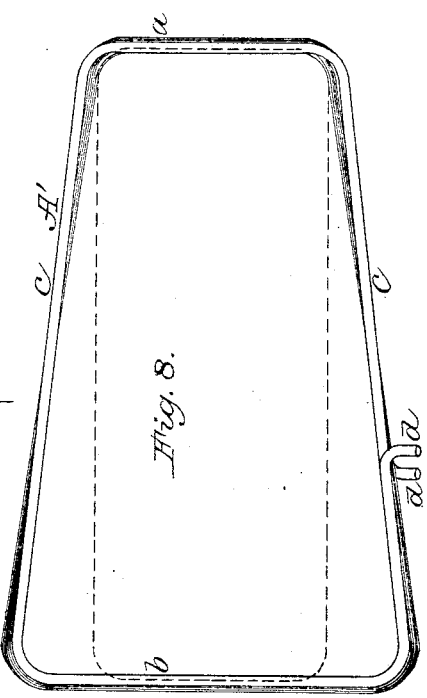
Attest:
Philip F. Larner.
Nowell Bartle
Inventor:
Rudolf Eickemeyer.
By M.B. Ward
Attorney.

(No Model.) 5 Sheets—Sheet 3.

R. EICKEMEYER.
DYNAMO ELECTRIC MACHINE.

No. 473,618. Patented Apr. 26, 1892.

Attest:
Philip F. Larner.
Lowell Bartle.

Inventor:
Rudolf Eickemeyer.
By ........ Attorney.

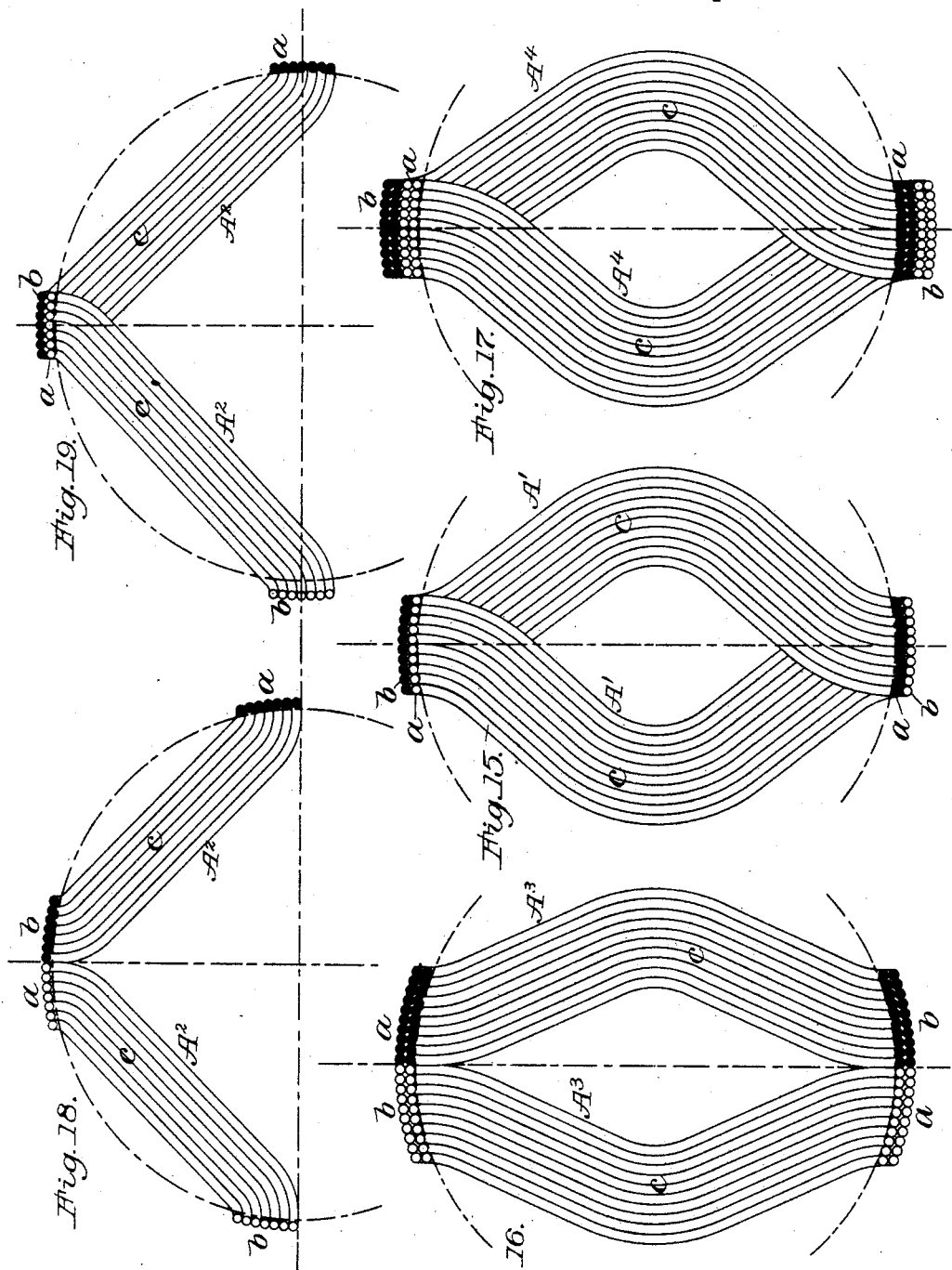

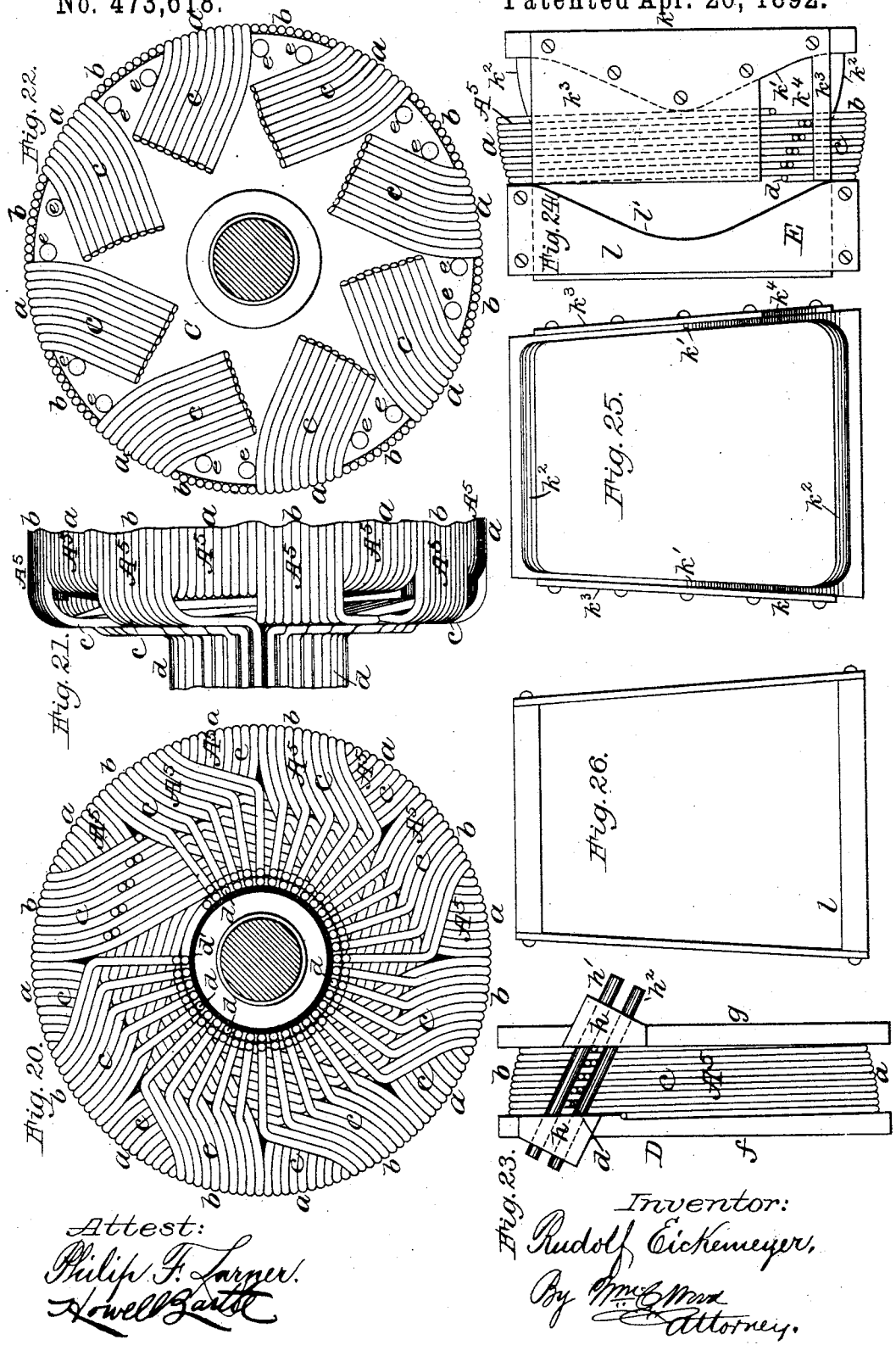

UNITED STATES PATENT OFFICE.

RUDOLF EICKEMEYER, OF YONKERS, NEW YORK.

DYNAMO-ELECTRIC MACHINE.

SPECIFICATION forming part of Letters Patent No. 473,618, dated April 26, 1892.

Application filed June 13, 1888. Serial No. 276,990. (No model.)

*To all whom it may concern:*

Be it known that I, RUDOLF EICKEMEYER, of Yonkers, in the county of Westchester and State of New York, have invented certain new and useful Improvements in Dynamo-Electric Machines; and I do hereby declare that the following specification, taken in connection with the drawings furnished and forming a part of the same, is a clear, true, and complete description of the several features of my invention.

My present improvements pertain to armature coils or "windings," and they are applicable to many forms of dynamo-electric machines, whether for use as motors or for generating electricity. In Letters Patent No. 377,996, issued to me February 14, 1888, I disclosed many novel windings or coils, each having at one side of its axial line lesser external dimensions than the internal dimensions of the other half of the same coil, so that complete counterpart coils of many convolutions each could be readily applied to a drum or core in forming an armature of the Siemens type. My present coils, as well as armature-cores clad therewith, embody certain features of invention secured under the aforesaid Letters Patent but I have now somewhat simplified the structure of the coils and rendered them specially adapted for use in bipolar armatures of small diameter and also of substantial value in such larger machines as may require greater economy in the construction of armatures than would accrue with the use of the higher grades of my coils disclosed in said patent. Said higher grades of coils have ends which are offset adjacent to the axial line of the coil, so that portions of each convolution at said offset lie parallel with the axis of the armature and make the two halves of the coil of different dimensions, but substantially alike in contour. My present bipolar armature-coils are of novel form, in that they have an outline like that of a "keystone," or, in other words, they have a short side and a long side, and ends which gradually diverge from the short side to the long side.

In a coil embodying my present invention the short side is of a length but little greater than the length of the face of the drum or core to which it is to be applied, and its long side is enough longer to afford at the adjacent portions of the ends of the coil and between them and the coincident ends of the drum or core sufficient space for the reception of underlying portions of as many other coils as may be necessary in each case, varying, of course, according to variations in the specific character of the coils and also of the armatures. In all cases my present bipolar coils have ends which gradually diverge from the short to the long side; but nevertheless said ends are varied in the matter of bends or curves only so far as will enable the two sides of the coil to occupy positions substantially opposite each other on the periphery of the armature, and also so as to provide for the presence of the armature-shaft.

Regardless of the polar arrangement of the armature, an important feature of my invention includes the combination of coils, as described, with an armature drum or core, and studs or pins in the ends of the armature for locking the coils to the core, each coil at its ends being located between two of said studs, and the sides of the coils lying flatly at the periphery of the armature and covering the same, and the ends of the coils also being laid flatwise at the ends of the armature-core.

In my present coils a large number of convolutions may be employed, and each coil can occupy extensive segmental portions of a drum or core, whether in bipolar or multipolar armatures, and each coil can embody wire in several layers, and pairs of such coils may be applied so that the long side of one coil will overlie the short side of another coil, thus providing for numerous layers of wire on the face of a drum or core, and also for enabling one side of a coil to lie next to said face at one side of the drum or core and to overlie the side of another coil at the opposite side of said core, as with certain kinds of my higher grades of coils disclosed in my aforesaid Letters Patent. I have also now provided for complete counterpart coils, each having many convolutions of wire, but divided up into sections, each with its own terminals, thus in substance enabling many small coils to be built up and applied to or removed from an armature drum or core, whether bipolar or multipolar, as if they were one large coil.

To more particularly describe my invention I will refer to the accompanying five sheets of drawings, in which—

Figure 14:
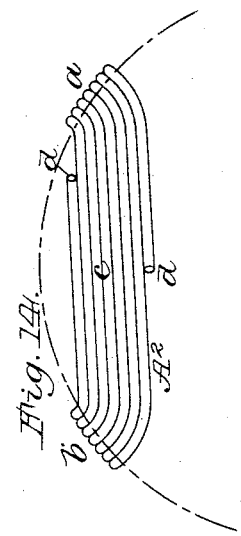
Figure 12:
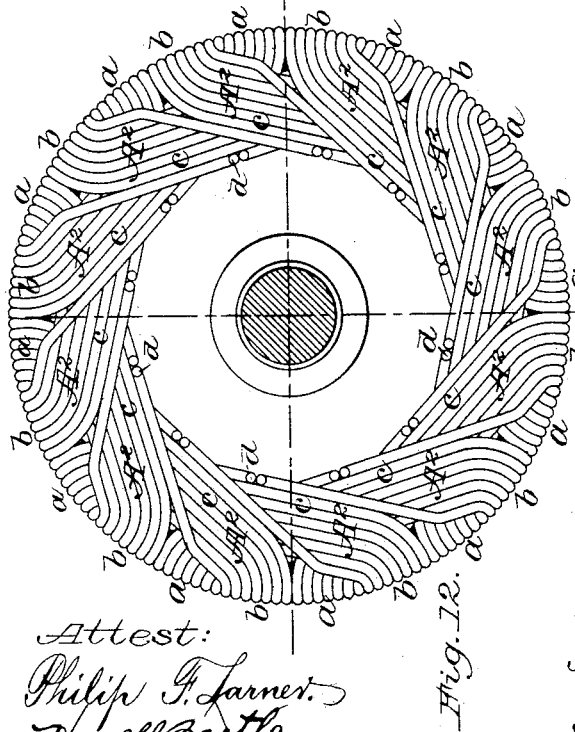
Figure 13:
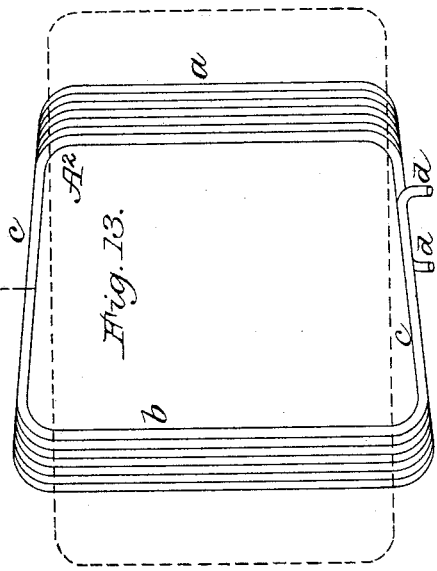

Figure 1 in side view illustrates a commutator and an armature for a bipolar machine with eight of my novel coils thereon, each having ten convolutions of wire and affording a single layer of wire on the face of the armature drum or core. Fig. 2 is an end view of said armature without the commutator, and it will be understood that a view of the opposite end of the armature will differ from the end shown only in that it would show no terminals. Fig. 3 in plan view illustrates one of said coils prior to its being bent or curved at the ends, and it clearly indicates the characteristic form of my coils as to outline to be that of a keystone as used in arches. Fig. 4 illustrates one of said coils in end view and bent or curved as when ready for application to the armature drum or core. Fig. 5 illustrates in end view one of said coils as it appears after coiling the wire as in Fig. 3 and before it has been bent or curved into the finished form, Fig. 4. Figs. 6 and 7, Sheet 2, in side and end views illustrate an armature for a bipolar machine having sixteen of my novel coils, each having ten convolutions, and said coils being so arranged as to afford two layers of wire on the face of the armature drum or core. Fig. 8 is a plan view of one of said coils prior to the bending or curving of its ends. Fig. 9 is an end view of one of said coils bent or curved and ready for application to a drum or core, the latter being partially indicated by curved dotted lines. Fig. 10 is an end view of such coil as when first coiled and prior to bending the ends, as in Fig. 9. Figs. 11 and 12, Sheet 3, in side and end views illustrate a four-pole armature having twelve of my coils, each having seven convolutions and affording a single layer of wire on the face of the drum or core. Fig. 13 illustrates one of said coils in plan view and with the outline of the face and ends of a drum or core shown in dotted lines. Fig. 14 is an end view of one of said coils with the peripheral line of a drum or core, indicated in dotted lines. Fig. 15, Sheet 4, illustrates sections of two of my novel coils of ten convolutions each, the long side of one coil overlying the short side of the other for affording two layers of wire at the face of a bipolar drum or core, which is indicated in curved dotted lines, and each coil having five convolutions on each side of the dotted diametrical line also, as in Fig. 7. Fig. 16 illustrates sections of two of my novel coils, each having twenty convolutions in two layers at the face of a bipolar drum or core, indicated in curved dotted lines, and each coil being wholly at the one side of a dotted diametrical line. Fig. 17 illustrates sections of two of my novel coils, each having twenty convolutions in two layers each, and with the long side of one overlying the short side of the other on the face of a bipolar drum or core, indicated in curved dotted lines, thus affording four layers of wire on said face and having ten convolutions of each coil on each side of the dotted diametrical line. Fig. 18 illustrates sections of two of my novel coils of seven convolutions each for affording one layer of wire on the face of a four-pole drum or core, indicated in a curved dotted line and segmentally arranged within the two dotted diametric lines, indicating the polar arrangement. Fig. 19 illustrates in section two of my novel coils of seven convolutions each and arranged on a four-pole drum or core, so as to afford two layers of wire on its face by having the long side of one coil overlie the short side of another and with the two dotted diametric lines passing through the central wires of both coils. Fig. 20, Sheet 5, illustrates in end view an armature clad with eight of my novel coils, each having ten convolutions, but divided up into five sections each for affording forty connections with an equal number of commutator-bars. Fig. 21 is a partial side view of the armature, Fig. 20. Fig. 22 is an end view of the drum or core with portions of the coils cut away at their ends and clearly illustrating my use of securing pins between the coils and occupying holes in the ends of the armature-drum. Fig. 23 in end view illustrates a winding or coiling frame with a coil thereon like those in Fig. 20 as it appears prior to bending its ends. Fig. 24 in end view illustrates a "former" or bending-frame for finishing the initial coil into its complete form, such a coil being therein shown as if just transferred thereto from the winding-frame, Fig. 23. Figs. 25 and 26 are respectively plan views of the two main portions of the bending-frame or former.

It is to be distinctly understood that, while my present coils have a short side $a$ and a long side $b$ in common with the coils disclosed in my aforesaid Letters Patent, each of my present coils has ends $c\ c$, which gradually diverge from the short side to the long side, and hence said coils have an outline resembling that of a keystone, as clearly indicated in Figs. 3, 8, and 13, as well as by the plan views of the bending-frame or former, Figs. 25 and 26, and that however much the ends of the coils may be bent or curved with reference to the axis of an armature said coils nevertheless retain this novel and characteristic keystone form.

Referring now to Figs. 1 to 5, inclusive, the coils A have each ten convolutions, and each has a short side $a$ and a long side $b$ and ends $c$, which gradually diverge from the short side to the long side, and the terminal $d$ of the coils are connected with eight bars of a commutator B, which, with the armature drum or core C, are suitably mounted upon a proper shaft. In this instance the coils afford one layer of wire on the drum or core, and portions of the ends $c$ adjacent to the long sides $b$ overlie portions of the ends $c$ (more or less)

adjacent to their short sides $a$, and the space between the end of the drum C and the widest portion of each coil is sufficient for the reception of these intervening portions of the outer coils. In each instance, at such points on the ends of the drum or core as are not covered by the ends of the coils, pins $e$ are tightly but detachably inserted into holes in the drum for absolutely locking the coils in position. These coils on this armature, Fig. 1, being grouped so that the diametrical line will pass between two coils, as in some bipolar machines, each at its ends requires comparatively little bending. These coils A are first wound or coiled into shape, as indicated in Figs. 3 and 5, and then the ends are bent, as shown in Fig. 4, and the terminals $d$ are arranged, as shown, thus fitting the coil for application to the drum or core on which the set of coils is assembled and adjusted until the desired alternating positions of the sides are obtained and the pins inserted, after which the armature is peripherally bound in the usual way by bands. (Indicated by dotted lines in Fig. 1.) It will of course be understood that the initially wound coil has its ends of sufficient length to compensate for the shortening effect, due to bending the ends into the desired form. In this armature, Fig. 1, the alternation of the short sides $a$ with the long sides $b$, is clearly shown, and it will be seen that the massed wire at the ends occupies much less space on the axial line of the armature than the same quantity of wire would occupy if wound in the ordinary manner.

The coils $A'$ of Figs 6 to 10, inclusive, have each the short side $a$, long side $b$, and ends $c$ $c$, which diverge from the short side to the long side. Each coil has ten convolutions, and as the diametrical line passes through both sides of a coil its ends $c$ are curved or bent more than in the previous instance.

The armature drum or core of Figs. 6 and 7 is clad with sixteen of these coils, and the short side $a$ of each is overlaid by the long side $b$ of another coil, and as the coils are counterparts and each of the keystone form the ends $c$ in part overlie and in part underlie portions of the ends of other coils, and the space between the ends of the core and the ends of the coils at their widest portions is such as to freely accommodate the underlying portions of the other coils. These coils, like those previously described, are first wound, as indicated in Figs. 8 and 10, and then bent to form, as in Fig. 9. The sixteen pairs of terminals $d$ are coupled to sixteen bars of the commutator B, an insulating-ring $d'$ being provided as a support for the insulated wire between the commutator and the head of the armature core. Sections of two of these coils $A'$ are shown in Fig. 15, the peripheral line of the core being indicated in dotted lines.

In Figs. 11 to 14 coils $A^2$ are shown, each having eight convolutions of wire and each having a short side $a$, a long side $b$, and ends $c$ $c$, which diverge from the short to the long sides, and each end $c$ near the sides is curved to provide for a close and symmetrical arrangement of the wire near and upon the face of the core C in one layer. The armature here shown being for a four-pole machine, the sides of each coil occupy a space within one-quarter of the periphery of the core or drum, and the terminals $d$ are coupled to the bars of the commutator B, as before described.

In Fig. 18 two of these coils $A^2$ are shown in section as if in position on the drum or core of a four-pole armature, the face of which is indicated by the curved dotted line, and in Fig. 19 similar coils $A^2$ are shown as arranged for affording two layers of wire on the face of the armature, the long side $b$ of one coil overlying the short side $a$ of another coil.

In Fig. 16 coils $A^3$, similar to the coils A of Fig. 1, are shown; but these differ, in that each has twenty convolutions wound to afford in the sides $a$ and $b$ two layers of wire on the face of the drum or core.

In Fig. 17 coils $A^4$ are shown, which are similar to the coils $A'$ of Figs. 6 to 10, inclusive, and Fig. 15; but these have twenty convolutions each, and they are arranged so as to afford four layers of wire on the face of a core. (Indicated by dotted lines.)

My novel coils, having any desired number of convolutions, may be divided up into sections, but still be in substance one coil—as, for instance, as illustrated in Figs. 20 and 21. These eight coils $A^5$ are each made up as if one coil of ten convolutions; but each coil is divided into five sections of two convolutions each. These coils have each the short side $a$, the long side $b$, and the diverging ends $c$, and they afford forty terminals $d$ for connection with a commutator having forty bars, as will be clearly understood from Figs. 20 and 21.

In Fig. 22 the coils are shown as if cut away so as to disclose fully the securing-pins $e$, which detachably but firmly occupy holes in the ends of the drum or core C and securely lock the coils in position. It will be readily understood that coils thus divided into sections can be employed in multipolar machines as well as in bipolar machines, although I have only illustrated such coils in connection with a bipolar armature.

As heretofore stated, all of these coils are initially wound or coiled on frames, differing as to dimensions required in each case, and I have illustrated in Fig. 23, in end view, a coiling-frame D, having thereon a coil $A^5$, like those last described. It will be understood that between and detachably secured to the plates $f$ and $g$ there is a rim having a keystone outline and also so shaped as to afford the curvature at the short sides $a$ and long sides $b$ of the coil. These parts are united and can be applied to a lathe-head after the manner of a chuck. Two lugs $h$ are angularly bored to freely receive two pins $h'$ and $h^2$, between which space is afforded for reception of the terminals $d$ of the sections of the coil. The wire is applied while the frame is slowly rotated, the pins $h'$ and $h^2$ being removed, and at the laying of the second convolution one pin is inserted, a loop formed in the wire at the pin, the second pin inserted, and then the second convolution is continued into the third, which is laid with both pins removed, and when the fourth convolution is reached the pins are manipulated as before, and so on until the coil is completed. Then with the pins removed and the part $g$ of the frame lifted off, the coil, all complete, can be detached. The several loops should be long enough to afford when cut proper terminals for connection with commutator-bars. Such a frame without the pins will obviously serve for forming coils of similar dimensions having two terminals each.

The bending of the ends of the coils is performed by means of a former E, as shown in Figs. 24, 25, and 26. This former has the keystone form or outline, as clearly indicated. The base portion $k$ of the former has properly-curved convex faces $k'\ k'$, one on each side, and properly-shaped surfaces at $k^2\ k^2$ for engagement, respectively, with the inner surfaces of the short side $a$ and long side $b$ of the coil, and securing in them the contour required in each case for enabling them to properly lie on or across the face of an armature drum or core. Said base portion has also at each side guide-plates $k^3\ k^3$, which serve to maintain the ends of a coil in the desired flattened condition during the bending operation, and in this particular instance one of these guide-plates $k^3$ is slotted, as at $k^4$, to afford space for the several projecting terminals $d$ of the coil. The cap portion $l$ of the former has convex curved faces $l'$, (of which but one is shown,) which reversely correspond to the convex faces $k'\ k'$ of the base portion, and therefore when the base $k$ and cap $l$ are arranged opposite each other, as shown in Fig. 24, and with a coil $A^5$ interposed between them the forcing of the two parts together imparts to the coil the exact curved form desired in the ends of the coils without impairing their essential keystone form. It will of course be readily seen that the bending former must be adapted in each instance to the coil desired, not only with reference to its size, but also to the particular curve or bend desired at the ends, as well as the contour of the sides, which are to occupy the face of an armature drum or core; but in some instances one former with interchangeable extra parts can be relied upon for forming more than one kind of coil.

Having thus described my invention, I claim as new and desire to secure by Letters Patent—

1. The combination, substantially as hereinbefore described, of an armature drum or core having at its ends projecting studs or pins, and a set of counterpart detachable coils, each having a long side and a short side which is a little longer than the face of the drum or core and having ends which are located between said studs and diverge from the short side to the long side, said ends near their long sides overlying the ends of other coils near their short sides.

2. In a dynamo electric armature, a winding composed of a set of detachable counterpart coils, each having a keystone form and each having but one of its sides in immediate contact with the face of the armature drum or core, substantially as described.

3. In a bipolar dynamo-electric armature, the combination, with a drum or core, of a winding composed of a set of detachable counterpart coils, each having a short side and a long side located at opposite sides of the drum and ends which gradually diverge from the short side to the long side and which are bent or curved for avoidance of the axis or shaft of the armature, substantially as described.

4. An armature-coil or section of winding composed of many convolutions of wire which are divided into sections, each with its own terminals, the whole constituting a complete detachable coil having a long side and a short side for occupying positions on the face of an armature drum or core and also having ends which diverge from the short to the long side, substantially as described.

RUDOLF EICKEMEYER.

Witnesses:
JAMES S. FITCH,
R. EICKEMEYER, Jr.